United States Patent [19]

Sutton

[11] Patent Number: 4,641,191

[45] Date of Patent: Feb. 3, 1987

[54] STANDBY SYSTEM FOR VIDEO DISPLAY

[75] Inventor: Leroy Sutton, Wheeling, Ill.

[73] Assignee: Zenith Electronics Corporation, Glenview, Ill.

[21] Appl. No.: 559,163

[22] Filed: Dec. 7, 1983

[51] Int. Cl.$^4$ .............................................. H04N 5/57
[52] U.S. Cl. .................... 358/168; 358/190; 307/116
[58] Field of Search ............... 358/168, 161, 190, 188, 358/174, 83, 93, 105, 84, 110, 111, 112, 113; 307/116, 117; 340/554, 565, 566, 561, 568

[56] References Cited

U.S. PATENT DOCUMENTS

| | | | |
|---|---|---|---|
| 3,164,673 | 1/1965 | Sharon | 358/168 |
| 3,165,582 | 1/1965 | Korda | 358/168 |
| 4,031,408 | 6/1977 | Holz | 307/116 |
| 4,088,928 | 5/1978 | Waehner | 358/190 |
| 4,225,808 | 9/1980 | Saraceni | 307/116 |
| 4,270,157 | 5/1981 | Clark | 358/190 |
| 4,321,593 | 3/1982 | Ho | 358/190 |
| 4,417,278 | 11/1983 | Hensleigh | 358/188 |

*Primary Examiner*—Tommy P. Chin

[57] ABSTRACT

A video display system is normally operated to produce a low brightness display on a CRT. Viewer sensing apparatus, including a transmitter and a receiver, senses the presence of a viewer by reflection of ultrasonic energy and operates a transistor having a time delay switch coupled in its load circuit for instantaneously supplying full power to the display system to produce a normal brightness display on the CRT. A transistor override circuit simulates closure of the time delay switch in response to an override signal for producing a full brightness display on the CRT independent of the time delay switch. The time delay switch maintains a full brightness display on the CRT for a predetermined time after the viewer leaves.

1 Claim, 1 Drawing Figure

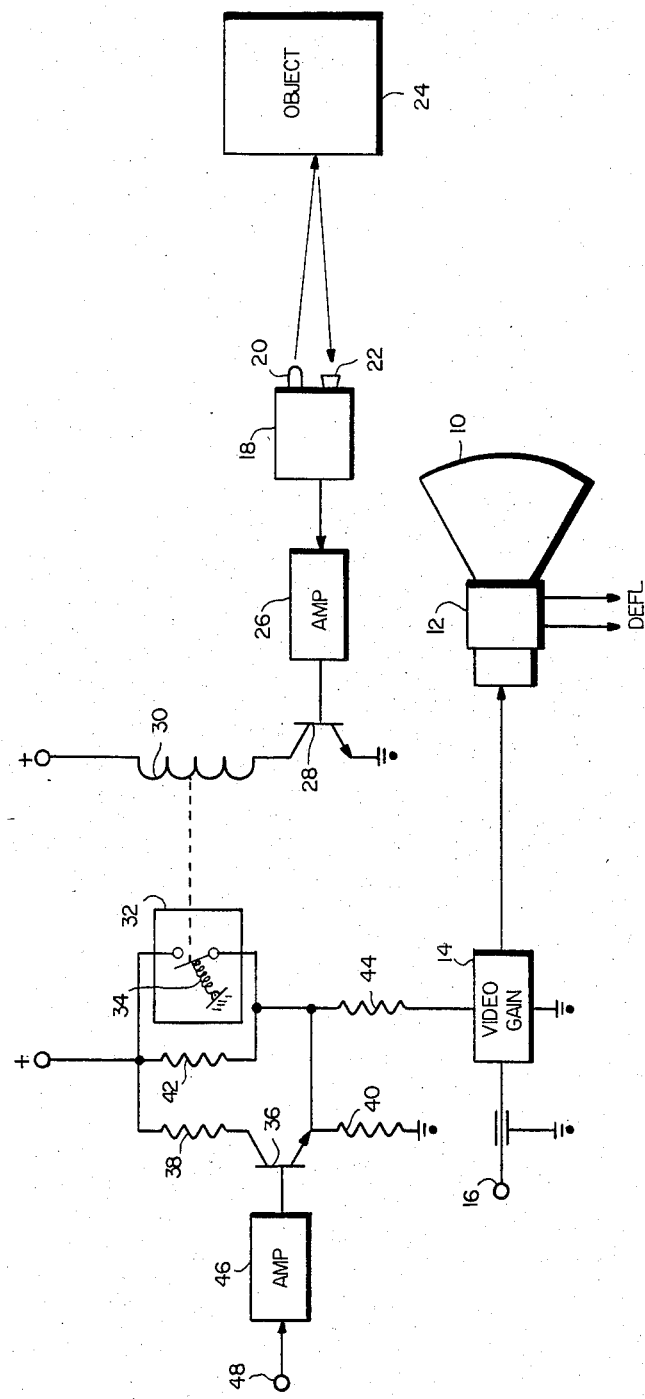

STANDBY SYSTEM FOR VIDEO DISPLAY

BACKGROUND OF THE INVENTION AND PRIOR ART

This invention relates generally to cathode ray tube (CRT) display systems and specifically to CRT display systems that are operated in a standby mode for substantial periods of time.

The use of CRT terminals has grown dramatically with increased acceptance of computers, word processors, automatic banking systems and a myriad of other consumer applications involving video displays. In a large number of applications, the actual utilization time of the CRT terminal, that is the time when a viewer is present and either observing or using the terminal, is relatively small in comparison with the time in which the terminal is on, but not in use or being viewed.

The CRTs and the light-emitting phosphors comprising their viewing screens have finite service lives which are related to the degree of their usage. CRTs that are subject to high brightness use generally experience correspondingly shorter useful phosphor life than those subject to low brightness operation. It is also well known that the bright stationary display patterns may permanently damage the phosphor viewing screen. Another factor worthy of note is that the power consumed by the CRT display system is the major component of the total power consumption of the terminal.

A co-pending application of the inventor, (D4924) Ser. No. 559,166, filed Dec. 7, 1983, and assigned to Zenith Radio Electronics Corporation, describes and claims a system for conserving power and prolonging life of high brightness display CRTs operated from vehicular battery sources. In that application the CRT filament heater circuit is operated at a low power level during standby and is switched to operate at a normal level responsive to receipt of a signal indicating that data is to be displayed. The present system is directed to the same general problem solved by the system of the copending application.

OBJECTS OF THE INVENTION

The principal object of this invention is to provide a novel CRT display system.

Another object of this invention is to provide a CRT display system having improved life and power consumption.

SUMMARY OF THE INVENTION

In accordance with the invention, a CRT display system includes video means supplying information for display on a CRT, viewer sensing means for sensing the presence of a viewer near the CRT, and switching means responsive to the viewer sensing means for changing the operating condition of the video means to produce a high brightness display in the presence of a viewer and a low brightness display in the absence of a viewer.

BRIEF DESCRIPTION OF THE DRAWING

These and other objects of the invention will become apparent from reading the following description in conjunction with the drawing, the single FIGURE of which is a partial schematic diagram of a CRT display system constructed in accordance with the invention.

DESCRIPTION OF THE PREFERRED EMBODIMENT

Referring to the drawing, a CRT 10 of conventional construction includes a deflection system 12 and is supplied with video information from a video gain block 14 which in turn is coupled to a video input terminal 16. The described display components may be driven from any of a number of conventional input sources including computer terminals, television system front ends and message display systems and the like, with appropriate well-known additional circuitry. For purposes of this invention the type of input source is of no consequence.

Viewer sensing means 18 includes transmitting means 20 and receiving means 22 for transmitting suitable energy and for receiving such energy by reflection. As shown, transmitting means 20 transmits ultrasonic energy that is reflected by an object, generally indicated by reference numeral 24, and received by receiving means 22. Practically speaking, object 24 comprises a viewer, either standing or sitting, closely adjacent to the faceplate of CRT 10 or the display terminal (not shown) that houses CRT 10. Other forms of energy and other techniques for sensing the presence of a viewer may readily be envisioned. For example, an infrared energy source may be used where the surrounding area permits establishment of a light energy path that is disturbed by the presence of a viewer. The viewer sensing means may also comprise a simple floor switch operable when a viewer occupies a predetermined position with respect to the CRT. Most such systems however, are environment dependent. In the preferred embodiment the transmitting and receiving means may both be conveniently installed in the terminal that houses the CRT and therefore are usable in any location.

The output of the viewer sensing means is supplied to an amplifier 26 which in turn feeds the input of a transistor 28 having a collector load circuit 30, indicated as a relay or solenoid coil, connected by a dashed line to a time delay means 32, having a spring-loaded switch 34 shown therein. Time delay means 32 may comprise any of a well-known number of relay or solenoid operated electrical switches which, upon energization, complete an electrical circuit and store energy in a spring or other mechanism. When the relay is deenergized, the stored energy is released at a controlled rate (by a mechanical escapement, for example) to produce a time-delayed opening of the switch.

Switch 34 in time delay means 32 is connected in parallel with a resistor 42 connected between a source of positive potential and a resistor 44 coupled to video gain block 14. In effect, closure of switch 34 shorts out resistor 42 which permits a greater voltage to be applied to video gain block 14. The greater voltage is actually the design operating potential for video gain block 14 that results in normal brightness of the CRT display. A lower operating potential is supplied to the gain block when switch 34 is open due to resistor 42 being in a series with resistor 44. This lower operating potential to the video gain block results in less than normal brightness of the CRT display in the standby mode.

An override circuit is provided to produce a normal brightness CRT display irrespective of the presence of a viewer or the state of viewer sensing means 18. This circuit comprises a transistor 36 having a collector coupled to positive potential by a resistor 38 and an emitter connected to ground through a resistor 40. The emitter of transistor 36 is also connected to the junction of resistors 42 and 44 and its base electrode is coupled through an amplifier 46 to an override input terminal 48. Upon receipt of a suitable signal at terminal 48, transistor 36 is driven conductive to short out resistor 42, as though switch 34 had been operated in response to the presence of a viewer. The provision of an override circuit enables the display system to be controlled from a remote point, should such be desired.

In normal operation, the display system is operated in a standby mode with reduced operating voltage being supplied to video gain block 14 due to switch 34 in time delay means 32 being open. When a viewer approaches the terminal, the signal from transmitting means 20 is reflected by him and picked up by receiving means 22. Amplification of the signal by amplifier 26 drives transistor 28 conductive and energizes relay coil 30, which operates time delay means 32 to close switch 34 and permit full operating potential to be supplied to video gain block 14. Video block 14, in turn, drives CRT 10 to full brightness.

When the viewer has completed his transaction at the terminal, or has read the message being displayed, or for any reason leaves, the signal transmitted by transmitting means 20 is not reflected back to receiving means 22 and transistor 28 becomes nonconductive. Coil 30 is deenergized and spring-loaded switch 34 begins to "time out". During this predetermined delay period, switch 34 remains closed and CRT 10 remains at full brightness level. Should viewer sensing means 18 not sense a viewer before the predetermined time period has elapsed, switch 34 opens and the CRT is returned to its low brightness standby mode.

It will be seen that the presence of a viewer immediately results in switch 34 closing to operate the CRT at full brightness. Also, as mentioned, a signal at override terminal 48 brings the CRT to full brightness, irrespective of the condition of switch 34. While the override signal, which preferably is closely tied to, if not a part of the video information to be displayed on the CRT, does not initiate operation of time delay means 32, as those skilled in the art will readily perceive, the circuit may readily be configured to control the switch directly.

What has been described is a novel video display system which is responsive to the presence of a viewer for operating at full brightness levels. It is recognized that numerous modifications and changes in the described embodiment of the invention will be apparent to those skilled in the art without departing from the true spirit and scope thereof. The invention is to be limited only as defined in the claims.

What is claimed is:

1. A video display system comprising:
   a CRT;
   video means including a video gain block for supplying information to said CRT for display;
   a source of B+ potential;
   a pair of resistors serially connected between said source of B+ potential and said gain block, said pair of resistors reducing the B+ potential available to said gain block sufficiently to operate said CRT at a low brightness level;
   sensing means, including an ultrasonic transmitter and an ultrasonic receiver, for detecting the presence of a movable object in a predetermined area adjacent said CRT by reflection of ultrasonic energy;
   switching means coupled to said sensing means for shorting out one of said resistors and enabling full operating potential to be applied to said video gain block for producing a high brightness display responsive to the presence of said movable object in said predetermined area;
   time delay means for maintaining said high brightness display for a time after removal of said movable object from said predetermined area; and
   a transistor having an output circuit coupled across said resistor for overriding said sensing means and producing a high brightness display independent of the presence of said movable object in said predetermined area whenever said transistor is energized.

* * * * *